UNITED STATES PATENT OFFICE.

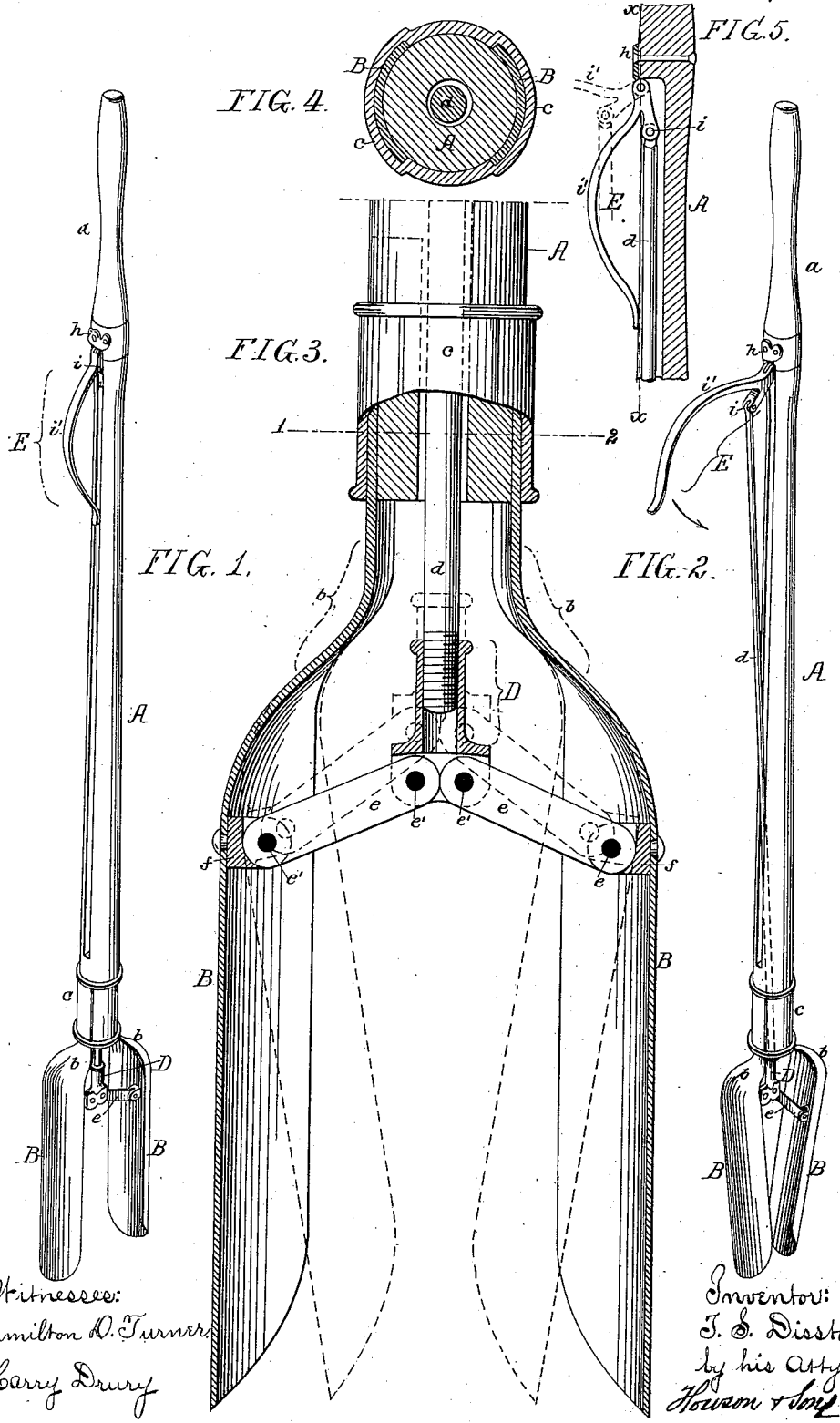

THOMAS S. DISSTON, OF PHILADELPHIA, PENNSYLVANIA, ASSIGNOR TO HAMILTON DISSTON, HORACE C. DISSTON, WILLIAM DISSTON, AND JACOB S. DISSTON, ALL OF SAME PLACE.

POST-HOLE-DIGGING IMPLEMENT.

SPECIFICATION forming part of Letters Patent No. 333,452, dated December 29, 1885.

Application filed October 10, 1885. Serial No. 179,496. (No model.)

*To all whom it may concern:*

Be it known that I, THOMAS S. DISSTON, a citizen of the United States, and a resident of Philadelphia, Pennsylvania, have invented certain Improvements in Post-Hole-Digging Implements, of which the following is a specification.

My invention relates to improvements in post-hole-digging implements, fully described and claimed hereinafter.

In the accompanying drawings, Figures 1 and 2 are perspective views of my improved post-hole-digging implement, Fig. 1 showing the blades forced apart, and Fig. 2 showing the blades sprung together. Fig. 3 is an enlarged sectional view; Fig. 4, a section on the line 1 2, Fig. 3; and Fig. 5, a sectional view of part of the implement.

A is a tubular stem, having a suitable hand-hold, $a$, at its upper end, and having secured at its lower end two blades, B B, by means of a sleeve or ferrule, $c$, recessed at opposite sides, as shown in Fig. 4, to receive the upper ends of the blades. The blades B B are preferably made of steel, the portion $b$ of each blade being tempered and forming a spring; and the tendency of the spring is to force the blades together, as shown in Fig. 2, and by dotted lines in Fig. 3.

Passing through the tubular stem A is a rod, $d$, the lower end of which is threaded for the reception of a head, D. To this head are pivoted the links $e$ $e$, whose opposite ends are attached to lugs $f f$, secured to the inner sides of the blades. The upper portion of the rod is hinged at $i$ to a lever, E, which is pivoted to a casting, $h$, secured to the stem A. The lever E has a suitable handle, $i'$, by which it is manipulated. When this handle is forced down, to push the blades apart, the end of the handle $i$ bears against the stem A and locks the blades, as described hereinafter.

To operate my improved digging implement, the lever E is first turned down to the position shown in Fig. 1, which forces the blades apart by means of the knee-joint. As soon as the pivot-point $i$ passes the center line, $x$, Fig. 5, the tendency of the spring-blades is to force the handle $i'$ of the lever E against the stem A, thus locking the blades in their separated position, Fig. 1. The implement is now thrust into the ground, and then by moving the handle $i'$ from the position shown in Fig. 1 to that shown in Fig. 2 the blades are released as the pivot-point $i$ passes the center line, $x$, and the blades themselves spring together to the position shown in Fig. 2, so as to retain the earth between the blades. The implement is then lifted out from the hole, with the load of earth, one hand being placed on the hand-hold $a$ and the other on the lever E. The earth can then be released and dumped by pressing down the lever E to force the blades apart, as before.

In order to adjust the distance of the blades apart when in their extended position, I thread the lower end of the rod $d$, and also the socket on the head D, so that by withdrawing the pivot-pins $e'$ or the pin $i$ the head D or the rod $d$ can be turned and the blades adjusted as required.

It will be seen by referring to Fig. 3 that the strain of the knee-joint is not on the pivot-pins $e'$, for the ends of the links $e$ bear against each other and against the lugs $f$.

I am aware that transplanters have been constructed with spring-blades; but in such cases the blades tended to spread outward. I am also aware that post-hole diggers with pivoted blades and handles have been provided with spiral springs to tend to force the handles apart and the blades together. I do not claim either of these constructions; but

I claim as my invention—

1. The combination of the inwardly-tending spring-blades of a post-hole-digging implement with devices for forcing the blades apart, substantially as described.

2. The combination of the spring-blades and supporting-stem with knee-joint links placed between the two blades and an operating-rod connected to knee-joint links, substantially as set forth.

3. The combination of the spring-blades, the supporting-stem, and links $e$ $e$, pivoted to the blades, with a head, D, and an operating-rod adjustably connected to the said head, substantially as described.

4. The combination of the inwardly-tending spring-blades with a knee-joint for separating the blades, a rod, d, connected to the knee-joint, and a handled lever, E, connected to the rod, substantially as described.

In testimony whereof I have signed my name to this specification in the presence of two subscribing witnesses.

THOMAS S. DISSTON.

Witnesses:
HARRY SMITH,
HENRY HOWSON.